United States Patent [19]
Gamble

[11] 4,091,298
[45] May 23, 1978

[54] CRYOGENIC CURRENT LEAD CONSTRUCTION WITH SELF-CONTAINED AUTOMATIC COOLANT VAPOR FLOW CONTROL

[75] Inventor: Bruce B. Gamble, Elnora, N.Y.

[73] Assignee: General Electric Company, Schenectady, N.Y.

[21] Appl. No.: 641,836

[22] Filed: Dec. 18, 1975

[51] Int. Cl.[2] .............................................. H02K 9/00
[52] U.S. Cl. ........................................ 310/52; 310/10; 310/198
[58] Field of Search ..................... 310/54, 52, 264, 10, 310/40, 265, 165, 194, 198, 201, 205, 261; 62/55, 505; 336/DIG. 1

[56] References Cited

U.S. PATENT DOCUMENTS

| 3,571,634 | 3/1971 | Sato | 310/54 |
| 3,731,865 | 5/1973 | Wood | 310/54 |
| 3,809,933 | 5/1974 | Sugawara | 310/10 |

OTHER PUBLICATIONS

A. Bejan, Improved Thermal Design of The Cryogenic Cooling System for a Superconducting Sync. Gen.; 12/20/74; pp. 145-167.

*Primary Examiner*—R. Skudy
*Attorney, Agent, or Firm*—Richard G. Jackson; Joseph T. Cohen; Jerome C. Squillaro

[57] ABSTRACT

An automatic arrangement is provided for control of the flow of vaporized coolant used for removing heat from each of the current leads carrying current to the rotor winding of a superconducting rotor. That portion of each lead extending from a coolant vapor return duct (through which the leads enter the machine) into the rotor winding chamber is formed as a hollow insulated (electrically and thermally) structure. The terminal length thereof is turned radially outward and the open outer end thereof is disposed below the surface of the pool of liquid coolant in the rotor winding chamber. A vapor trap is defined in the hollow lead, the vapor therein having a pressure greater than the pressure in the vapor core in the rotor winding chamber, this pressure differential being accommodated by a difference between the liquid level of the pool and the level of the liquid entering into the outer end of the hollow lead.

11 Claims, 5 Drawing Figures

CRYOGENIC CURRENT LEAD CONSTRUCTION WITH SELF-CONTAINED AUTOMATIC COOLANT VAPOR FLOW CONTROL

BACKGROUND OF THE INVENTION

The leads electrically connecting a superconducting coil at cryogenic temperatures to a current distribution device (e.g. slip rings, brushes) at normal room ambient temperatures represents a particularly important aspect in the design of superconducting rotors. Such leads carrying current to the superconducting coil must be so designed as to perform their function without failure (i.e., due to overheat and burn-out) under all operating conditions.

Inherently, these leads have a high thermal conductivity and represent a major source of heat leakage into the cryogenic portion of the machine and they must be effectively cooled so as to minimize this heat leakage.

The instant invention provides a solution to this problem in the manner described herein.

DESCRIPTION OF THE INVENTION

Automatic means are provided for control of the flow of vaporized coolant used for removing heat from each of the current lead structures carrying current to the rotor winding of a superconductive rotor. These current lead structures enter the rotor within means for withdrawing coolant vapor flow from the rotor. That portion of each lead structure extending from the coolant vapor withdrawing means into the rotor winding chamber is structurally adapted to provide both means for carrying current to and from the superconductor and means for conducting coolant vapor over surface area of the current-carrying means coextensive therewith. The terminal length of this portion is turned outward in the substantially radial direction and the open outer end thereof is disposed below the surface of the pool of liquid coolant in the rotor winding chamber. Liquefied coolant enters this terminal length and defines a vapor trap in the vapor conducting means. As heat is transferred from the current-carrying means to this liquefied coolant, liquid coolant boils and pressurizes the vapor trap forcing coolant vapor along the current-carrying means to the coolant vapor withdrawing means simultaneously insuring that the liquefied coolant will not leave the rotor winding chamber via the lead structures.

BRIEF DESCRIPTION OF THE DRAWINGS

The features of the invention believed to be novel are set forth with particularity in the appended claims. The invention itself, however, as to the organization, method of operation, and objects and advantages thereof, may best be understood by reference to the following description taken in conjunction with the accompanying drawings in which:

FIG. 2A is taken on line A—A.

METHOD AND PROCESS OF MAKING AND USING THE INVENTION

Figure 1:
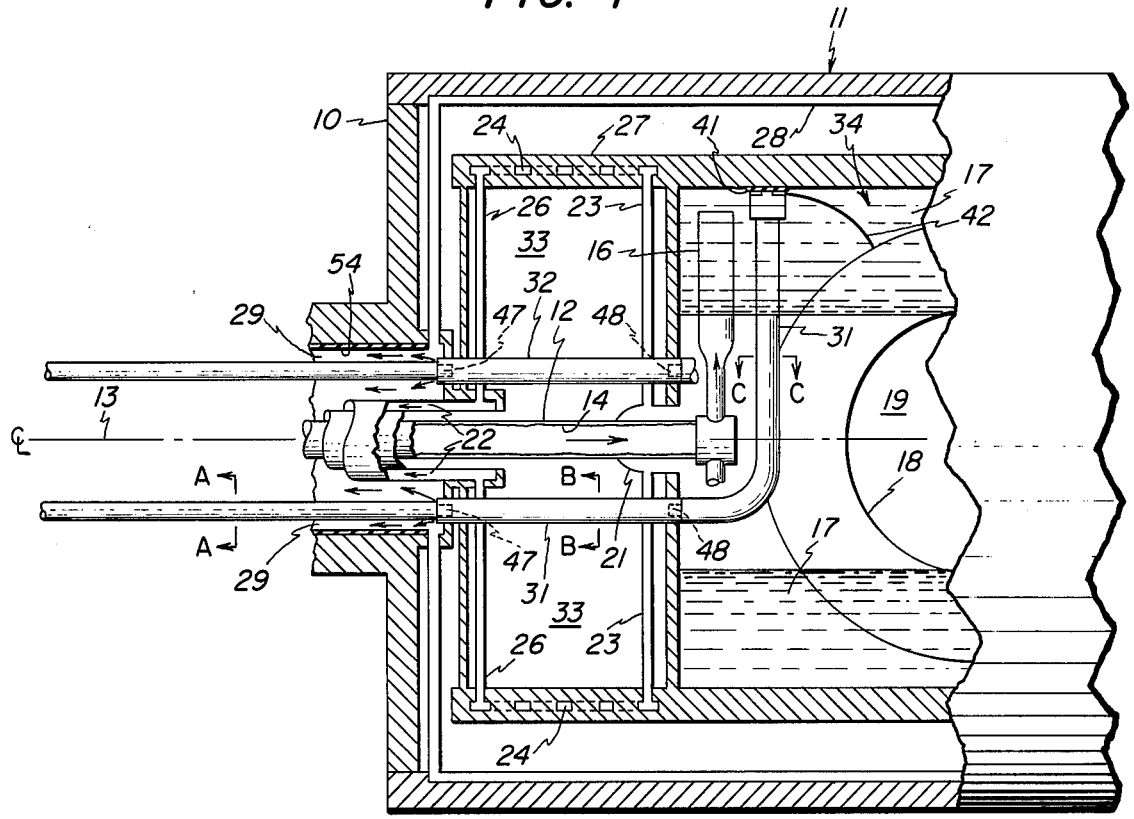
FIG. 1 is a schematic longitudinal view partly in section of a portion of a superconductive A.C. generator rotor embodying the instant invention.

The collector (non-driven) end 10 of a superconducting rotor 11 for an A.C. machine is shown in FIG. 1. Cryogenic refrigerant in the form of saturated liquefied coolant, typically helium at 4.2° K, is supplied to the collector end of the rotor through a conduit 12 from a transfer joint (not shown) in a manner such as is described and claimed in U.S. patent application Ser. No. 573,170 — Hatch, filed Apr. 30, 1975, and U.S. patent application Ser. No. 573,169 — Laskaris, filed Apr. 30, 1975 now U.S. Pat. No. 3,991,588 This U.S. patent application and U.S. patent are assigned to the instant assignee and are incorporated by reference.

As conduit 12 rotates axially about longitudinal axis 13 in unison with rotor 11, the coolant in conduit 12 separates centrifugally into a vapor phase core surrounded by a liquid phase film, producing a vapor-liquid interface 14. Conduit 12 is terminated at, and is in flow communication with, refrigerant dispensing means 16 whereby liquid coolant is conducted to the pool 17. The delivery duct employed herein is that disclosed in copending U.S. patent application Ser. No. 573,168 — Laskaris et al., filed Apr. 30, 1975, assigned to the assignee of the instant invention and incorporated by reference. The self-regulating transport characteristics of delivery duct 16 regulate the height of the liquid surface in pool 17. Rotor windings 18 are immersed at least in part in pool 17.

Coolant in the vapor phase in rotor 11 is returned from the central vapor core 19 at the collector end 10 to a refrigerator compressor (not shown) via hub 21 in flow communication therewith. The gaseous coolant flows from hub 21 into a conduit 22 via conduit system 23, 24, 26 cooling a portion of torque tube 27. Conduit 22 conducts this coolant vapor to the transfer joint from which it is discharged to the compressor for reliquefaction. Similarly, coolant in the vapor phase is returned from the driven end (not shown) of rotor 11 via conduit 28 in flow commmunication with central core 19 at the driven end. The gaseous coolant return flow from conduit 28 enters annular space 29 and is also returned for reliquefaction.

Materials for construction of the structural components of the device must be compatible with the mechanical and thermal stress constraints imposed. Thus, in the cryogenic system certain stainless steels, for example, meet these criteria.

The system should be capable of performing properly at different mass flow rates of liquid coolant and coolant flow should be controlled accurately such that the minimum required flow is supplied. To increase efficiency, vapor supplied with the liquid, or released from it through any transport process, is utilized for cooling various portions of the rotor including the current leads. For a given operating current, a lead aspect ratio (lead length to cross section) exists that yields a minimum coolant demand. This may be looked upon as a thermal optimum, but it is preferable to select a lead aspect ratio that will be capable of carrying the steady state current, even in the event of loss of coolant, without overheating. Further, the lead structure must be capable of carrying the critical current of the superconductor applied during testing thereof.

Current leads 31, 32 carry current between slip rings (not shown) at room temperature and the rotor windings 18. The construction of leads 31, 32 is identical and, in the interest of clarity, details are provided only with respect to current lead 31.

The current lead structures in the rotor construction shown enter along annular duct 29, which also serves to withdraw a coolant vapor flow from the rotor for reliquefaction thereof. Since these lead structures 31, 32 are located off centerline 13 they are subjected to centrifugal loading and supports (not shown) should be supplied therefore at intervals. For optimization, the construction of each lead structure changes as, for example, is shown by the sections illustrated in FIGS. 2A, 2B and 2C encountered as the lead extends from duct 29 through vacuum chamber 33 to terminate in rotor winding chamber 34. Within rotor winding chamber 34 the lead 31 turns from the axial direction to proceed in the generally radial direction toward the torque tube 27 extending into pool 17.

This terminal length of lead 31 comprises hollow copper rod 36, thermal insulating sheath 37 and outer metal cover 38. Preferably sheath 37 would be made of polytetrafluoroethylene (PTFE) or other plastic able to provide an effective thermal barrier (as well as electrical insulation) in order that the lead will transfer substantially all of the heat conducted therealong and generated therein to the liquid within hollow core 39. Cover 38 will be of stainless steel, preferably, but other metals and alloys may be used. Also, although copper is preferred as the means for carrying current in the lead structures, other metals such as aluminum, brass or stainless steel may be used where copper is indicated herein.

The distal end of rod 36 is spaced from torque tube 27 by insulating (thermal and electrical) block 41. As shown, a bare length of rod 36 protrudes from sheath 37 and cover 38 and accomodates semiconductor lead 42 wrapped therearound and soldered or brazed thereto. Lead 42 electrically interconnects lead 31 with superconductor windings 18. The bare length of copper is covered by plastic sleeve 43, several slots or grooves 44 being provided therein to permit the unencumbered passage of liquid coolant therethrough and to accomodate the disposition of lead 42. Similar slots, or grooves, 46 permit liquid coolant to freely enter core 39 as required.

Figure 3:
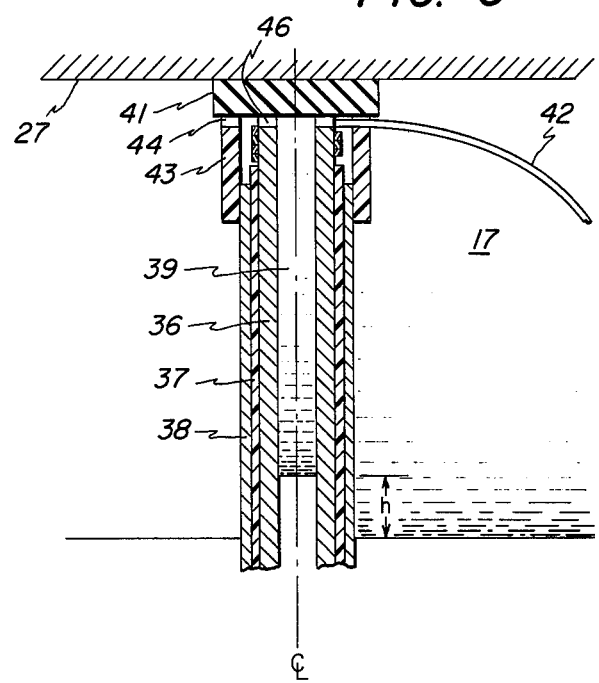
FIG. 3 is an enlarged schematic view in section showing the outer open end of the terminal length of the current lead structure, the vapor trap, and the difference in liquid encountered during rotation of the machine.

As shown in FIG. 3 (during rotation of rotor 11) the level of the pool liquid and the level of the liquid in the core 39 differ by a distance $h$. This reflects the fact that the pressure in the vapor trap radially inward of the liquid in core 39 is greater than the pressure in vapor core 19.

The operating principal is that heat from the lead structure vaporizes liquid coolant in contact with the lead structure, primarily within core 39. Substantially all the vapor generated from this undesired heat is generated and trapped in core 39 and (being pressurized by the vapor generation) is forced to flow via the vapor conducting means (whatever configuration or structure is provided) to empty into duct 29 (as will be explained) cooling the lead structure during transit.

The coolant demand of the vapor-cooled lead appears to be very responsive to changes in current. As heat reaches the liquid in core 39 and liquid in the core is vaporized, the vaporized liquid is replaced in core 39 due to the rotational velocity and the coolant vapor proceeds to cool the lead structure. Thus, a self-correcting system is provided, which automatically provides correlation between the heat in (via the lead structure) and the coolant vapor flow generated to cool the lead structure.

The centrifugal head offsets the head in the vapor (the radially-extending length of core 39), flow resistance encountered by the coolant vapor in transit to duct 29 and the difference in pressure between vapor core 19 and duct 29.

Figure 2A:
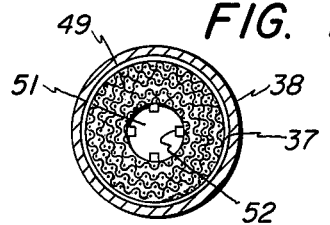
FIGS. 2A, 2B and 2C provide sectional views of preferred construction at the indicated locations along the current lead structure illustrated, i.e.
Figure 2B:
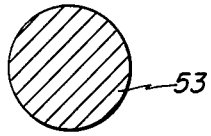

The lead structure illustrated in FIG. 2B extending between junctures 47 and 48 comprises woven wire screen (or expanded metal mesh) 49, preferably of copper, wound around a rod 51 to provide stiffness to resist undesirable distortion of the wrapped screen under the influence of the applied centrifugal stresses and overlapping and soldered to rod 36. Rod 51 may be of PTFE, nylon, etc., and may have grooves 52 recessed therein for the insertion of monitoring instrumentation (not shown), if desired. Rod 51 does not extend all the way to joint 48 in order that coolant vapor flow can freely pass from core 39 into the tortuous, high surface area passages in wrapped screen 49. Sheath 37 and cover 38 continue as the outer components of the lead structure whereby vapor cannot escape at juncture 48. Maximum temperature reduction of the lead structure occurs where the leads are surrounded by the vacuum conditions established in chamber 33. In penetrating chamber 33 with the lead structures preferably adequate sealing means (not shown) incorporating means to compensate for thermal expansion and contraction would be provided to insure the integrity of the vacuum conditions in chamber 33. If desired, metal cover 38 can be welded to the walls of chamber 33 penetrated thereby.

In contrast to the temperature difference between junctures 47 and 48, the temperature difference between juncture 48 and the surface of pool 17 is small.

At juncture 47 between the lead structure illustrated in FIG. 2A and that already described in FIG. 2B provision is made for the coolant vapor to leave the volume within the lead structure and enter duct 29 to combine with the other coolant vapor flow therein. The preferred construction for the lead to the left of juncture 47 is solid uncovered copper bar stock 53. At juncture 47 the diameter is reduced to form a shoulder to receive screen 49, which is soldered thereto. Outer layers 37, 38 are terminated short of juncture 47 to enable the vapor coolant flow to enter duct 29 from the exposed surface of screen 49. The inner surface of the wall of duct 29 is shown covered with a layer of electrically insulating material 54.

It is contemplated that the lead structures can be constructed as a hollow metallic rod extending from the slip rings to the terminal end in chamber 34 with an outer layer of electrical/thermal insulation (such as layer 37) and a metal cover (such as layer 38). Also, as another variation the portion of each lead structure comparable to the length from juncture 47 to the terminal end can be in the form of a non-metallic conduit having a metallic conductor (e.g., a continuation of bar stock 53) housed therein, there being clearance between conductor and conduit for the vapor coolant flow.

Figure 2C:
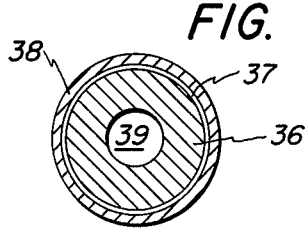

In the design of leads for particular superconducting rotors the exact lengths and cross-sections of the configurations per FIGS. 2A, 2B and 2C would be adjusted to yield the desired trade-off between lead electrical resistivity and thermal conductance.

The best mode contemplated for this invention has been disclosed herein utilizing the construction of the lead structures disclosed and the preferences indicated for materials to be used.

What I claim as new and desire to secure by Letters Patent of the United States is:

1. In a superconducting rotor wherein means are connected to said rotor for rotation thereof, means are provided in flow communication with the rotor winding chamber of said rotor to supply liquefied gas thereto as the coolant for maintaining rotor windings disposed therein submerged at least in part in a pool of liquefied gas and at cryogenic temperatures, means are provided in flow communication with said rotor winding chamber for withdrawing coolant vapor therefrom, and means electrically connected to said rotor windings are provided to carry current between a current distribution device at room temperature and said rotor windings at cryogenic temperatures, the improvement wherein a portion of each current-carrying means is provided with means open at both ends for conducting a confined flow of coolant vapor along and in contact with said current-carrying means, said means for conducting coolant vapor being in flow communication at one open end thereof with some part of said means for withdrawing coolant vapor;

said portion having a terminal length thereof extending into said rotor winding chamber, said terminal length being disposed in the generally radial direction locating the other open end of said means for conducting coolant vapor adjacent the wall of said rotor winding chamber, said other open end being submerged below the surface of said pool of liquefied gas during operation to enable liquefied gas to freely enter therein, whereby cooling vapor can be generated by the transfer of heat from said current-carrying means to the liquefied gas within said means for conducting coolant vapor, said vapor so generated being trapped within said means for conducting coolant vapor for transport to said one open end, whereby said current-carrying means is cooled.

2. The improvement recited in claim 1 wherein said current-carrying means in said terminal length is in the form of a metal rod having a hollow core and said means for conducting coolant vapor is said hollow core.

3. The improvement recited in claim 2 wherein said portion of each current-carrying means includes a second length electrically and hermetically connected to said terminal length, said second length having the current-carrying means formed as a rolled metal screen and the means for conducting coolant vapor formed as a tubular thermal and electrical insulation barrier enclosing said screen.

4. The improvement recited in claim 3 wherein said metal rod and said metal screen connected thereto are both made of copper.

5. The improvement recited in claim 3 wherein said part of means for withdrawing coolant vapor is a duct in flow communication with a coolant circuit returning coolant vapor from the driven end of said rotor.

6. The improvement recited in claim 3 wherein said rolled metal screen is wrapped around a solid rod of electrically insulating material.

7. The improvement recited in claim 3 wherein said tubular insulation barrier extends continuously over most of said terminal length and said second length and is in turn enclosed within a tubular metal cover.

8. The improvement recited in claim 1 wherein thermal insulation is disposed along said terminal length to minimize outward transfer of heat therefrom.

9. In the method of operating a superconducting rotor driven within a stator assembly wherein liquefied gas is supplied to the rotor winding chamber as the coolant for maintaining the rotor windings at cryogenic temperatures, coolant vapor is withdrawn from said rotor winding chamber and current is carried to and from said rotor windings, the improvement comprising:

defining a thermally insulated volume in contact with surface area of each current-carrying means employed along a length thereof, a terminal portion of said volume being positioned in said rotor winding chamber in a location subject to significant centrifugal forces during rotor rotation, said terminal portion of said volume being defined in part by a surface of liquefied gas, transferring heat from said current-carrying means to liquefied gas in contact with surface area thereof and automatically replacing such liquefied gas as it is converted to the vapor phase, said vapor phase being displaced along said thermally insulated volume into a second volume transporting coolant vapor being withdrawn from said rotor winding chamber.

10. The improvement recited in claim 9 wherein said liquefied gas is helium.

11. The improvement recited in claim 9 wherein a significant length of said current-carrying means lies within an evacuated region.

* * * * *

UNITED STATES PATENT AND TRADEMARK OFFICE
CERTIFICATE OF CORRECTION

PATENT NO. : 4,091,298
DATED : May 23, 1978
INVENTOR(S) : Bruce B. Gamble

It is certified that error appears in the above-identified patent and that said Letters Patent are hereby corrected as shown below:

In column 3, line 38, for "semiconductor" read
-- superconductor --

Signed and Sealed this

Tenth Day of April 1979

[SEAL]

Attest:

RUTH C. MASON
Attesting Officer

DONALD W. BANNER
Commissioner of Patents and Trademarks